United States Patent
Knecht et al.

(10) Patent No.: US 6,659,573 B1
(45) Date of Patent: Dec. 9, 2003

(54) WHEEL AND TRACK FOR A CRAWLER VEHICLE UNDERCARRIAGE

(75) Inventors: Alexander Knecht, Zweibrücken (DE); Ingo Noske, Lebach (DE); Werner Rutz, Queidersbach (DE)

(73) Assignee: Terex-Demag GmbH & Co. KG, Zweibrücken (DE)

( * ) Notice: Subject to any disclaimer, the term of this patent is extended or adjusted under 35 U.S.C. 154(b) by 0 days.

(21) Appl. No.: 09/980,333

(22) PCT Filed: Apr. 14, 2000

(86) PCT No.: PCT/DE00/01238

§ 371 (c)(1),
(2), (4) Date: Oct. 26, 2001

(87) PCT Pub. No.: WO00/64728

PCT Pub. Date: Nov. 2, 2000

(30) Foreign Application Priority Data

Apr. 27, 1999 (DE) ......................... 199 20 025

(51) Int. Cl.⁷ .............................................. B62D 55/20
(52) U.S. Cl. ........................................ 305/195; 305/198
(58) Field of Search .............................. 305/171, 185, 305/191, 193, 195, 196, 198, 199, 201, 202

(56) References Cited

U.S. PATENT DOCUMENTS

| | | | | |
|---|---|---|---|---|
| 1,877,135 A | * | 9/1932 | Knox | |
| 2,167,039 A | | 7/1939 | Ekbom | |
| 2,392,382 A | * | 1/1946 | Hollencamp | |
| 2,530,379 A | * | 11/1950 | Davidson | |
| 2,727,794 A | * | 12/1955 | Davidson et al. | |
| 3,504,562 A | * | 4/1970 | Hirych | |
| 3,602,364 A | * | 8/1971 | Maglio | |
| 3,680,928 A | * | 8/1972 | Kraschnewski et al. | |
| 4,176,887 A | * | 12/1979 | Alpers et al. | |
| 4,278,301 A | * | 7/1981 | Gregor et al. | |
| 4,425,007 A | * | 1/1984 | Soeteber | |
| 4,455,053 A | * | 6/1984 | Rasmussen | |
| 5,161,867 A | * | 11/1992 | Johnson | |
| 5,399,003 A | * | 3/1995 | Katoh | |
| 5,636,911 A | | 6/1997 | Korpi | |

FOREIGN PATENT DOCUMENTS

| | | |
|---|---|---|
| DE | 194491 | 7/1907 |
| DE | 27 20 332 | 11/1978 |
| GB | 1 602 143 | 11/1981 |

\* cited by examiner

*Primary Examiner*—Russell D. Stormer
(74) *Attorney, Agent, or Firm*—Cohen, Pontani, Lieberman & Pavane

(57) ABSTRACT

A crawler undercarriage mechanism includes a plurality of running rollers, and at least one drive sprocket wheel which is provided with chain teeth, and has a running tread and wheel flanges on both sides. An endless chain with individual chain links which are connected releasably to one another by bolts and a plurality of interengaging outer and inner link plates is driven by the sprocket wheel. Each chain link has two guide webs which have a bearing surface, which interacts with the running treads, and a guide surface, which interacts with respective ones of the wheel flanges. The web guides have a cam-like element which connects the two webs and meshes with the chain teeth of the drive sprocket wheel. The drive sprocket wheel has an involute toothing arrangement which meshes with a rectilinear flank of the cam-like element, and top side of the respective guide web has a concavely curved bearing surface, which interacts with the convexly curved running-tread surface of the drive sprocket wheel. The webs also have an inner guide surface interacting with the wheel flanges and an outer guide surface providing for lateral guidance of the running rollers.

9 Claims, 4 Drawing Sheets

WHEEL AND TRACK FOR A CRAWLER VEHICLE UNDERCARRIAGE

PRIORITY CLAIM

This is a U.S. National Stage of application no. PCT/DE00/01238, filed on Apr. 14, 2000. Priority is claimed on that application and on the following application:

Country: Germany, Application No: 199 20 025.4, Filed: Apr. 27, 1999.

BACKGROUND OF THE INVENTION

The invention relates to a crawler undercarriage mechanism, in particular for cranes, comprising an idler, a plurality of running rollers, a drive sprocket wheel and an endless chain of individual chain links releasably connected one to another. The sprocket wheel drive has running treads and wheel flanges at each side thereof. The chain links have guide webs, the guide web shaving bearing surfaces which interact with the running treads, and guide surfaces which interact with the wheel flanges. A guide web cam-like element interacts with chain teeth on the drive sprocket wheel.

A crawler undercarriage mechanism of the generic type is known from U.S. Pat. No. 4,176,887 (Alpers et al.). It has a single-piece drive sprocket wheel which is provided with cam-like chain teeth on the circumference and with a running tread on both sides. In each case one wheel flange is formed as a result of the difference in diameter between the larger diameter of the root circle of the chain teeth and the smaller external diameter of the running treads. An endless chain guided offer the drive sprocket wheel, an idler and a plurality of running rollers comprises individual chain links which are produced in one piece, are designed as double grouser track shoes and are connected releasably to one another by means of bolts and interengaging outer and inner link plates. Each chain link has two guide webs which are located symmetrically in relation to the center and are spaced apart from one another in the running direction. On the top side, they are provided with a rectilinear bearing surface, which interacts with the running treads,land, on the inside, they are provided with a guide surface, which interacts with the respective wheel flange of the drive sprocket wheel. Arranged between the two guide webs is a cam which connects the two webs and interacts with the chain teeth. The cam is provided, on both sides, with rectilinear engagement surfaces which terminate in a cutting edge. At the transition from the planar engagement surfaces to the base plate of the chain link, the two-sided cam has a recess on both sides.

SUMMARY OF THE INVENTION

The object of the invention is further to develop a crawler undercarriage mechanism of the generic type in order, by reducing the surface pressure, to minimize the wear and to improve the guidance of the endless chain, with the high transmission capacity not being reduced in any way.

In accordance with the invention, the drive sprocket wheel has an involute toothing arrangement which meshes with a rectilinear flank of the cam-like element. By virtue of this toothing-arrangement geometry, the drive sprocket wheel/chain link pairing is approximately equivalent to a gearwheel/rack system with the advantages listed hereinbelow.

The surface pressure between the drive sprocket wheel and endless chain can be changed by the involute line being varied.

At the run-off point of the endless chain, the location of contact between the drive sprocket wheel and cam-like element of the endless chain is displaced outward along the involute, i.e. the wear is distributed over a relatively large region.

Force is transmitted in the region of the center of the involute tooth flank, i.e. the tip of the force-fitting tooth of the drive sprocket wheel is not subjected to loading.

An involute toothing arrangement is not affected by the change in the axial spacing of the meshing chain links. It is thus the case in the present system that the kinematics are not affected in any way by the endless chain moving up the drive sprocket wheel on account of chain lengthening or the penetration of dirt.

According to a further feature, the top side of the respective guide web has a concavely curved bearing surface, which interacts with the convexly curved running-tread surface of the drive sprocket wheel. The internal diameter of the concavely curved bearing surface is preferably equal to the external diameter of the convexly curved running-tread surface. In other words, the radius of curvature of the guide web concavely curved bearing surface corresponds to one-half the external diameter of the running tread surface. This configuration ensures a defined position in relation to the drive sprocket wheel, with the result that tilting cannot occur. Moreover, in a known manner, the two inner surfaces of the guide web perform the function of guiding the drive sprocket wheel and the two outer surfaces perform the function of lateral guidance between the running rollers.

It, is also advantageous that the shape of the chain tooth and the increase in the size of the opening of the endless chain as it runs onto the drive sprocket wheel aid the discharge of dirt.

According to a further feature, the drive sprocket wheel is designed in a number of parts with a centrally located toothed wheel rim and two running treads fastened releasably thereto. This arrangement makes it possible for the toothed wheel rim to be produced from a more wear-resistant material than the running treads; This achieves a longer service life of the drive sprocket wheel in relation to dirt and abrasion between the endless chain and drive sprocket wheel.

In order for it to be possible, with the selected configuration of the chain link, for large forces to continue to be transmitted, six outer link plates are arranged on one longitudinal side and four inner link plates, offset in relation to the outer link plates, are arranged on the opposite side. When two chain links are attached to one another, in each case three outer link plates and two inner link plates are connected by in each case one chain bolt, this producing a double-shear connection by means of which high forces can be transmitted. The chain bolt is secured against slipping axially by means of a screw/nut connection which is arranged in each case on the outside of the first and third outer link plates.

DESCRIPTION OF THE PRESENTLY PREFERRED EMBODIMENTS

Figure 1:
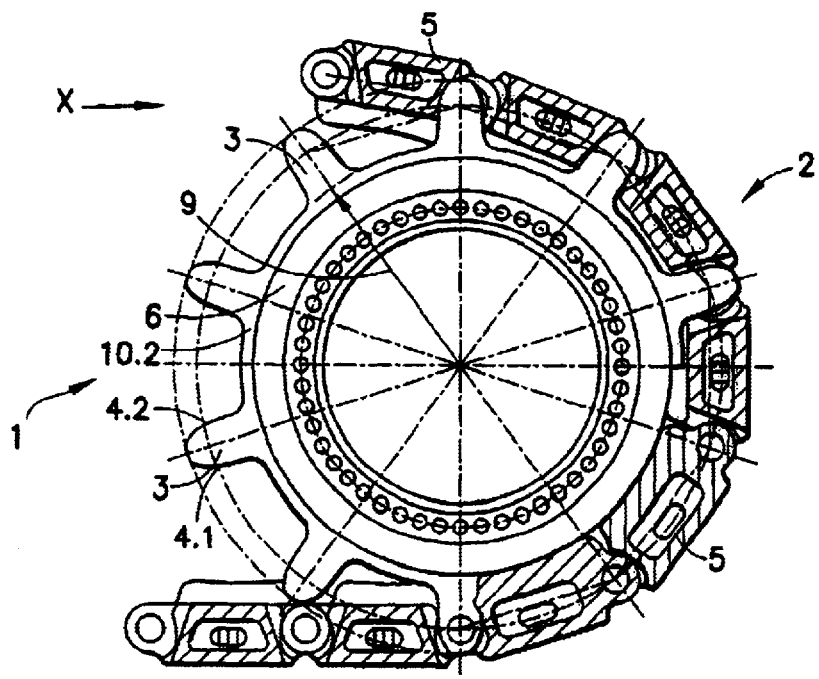
FIG. 1 is a front view of a drive sprocket wheel with part of the endless chain according to an embodiment of the present invention.
Figure 2:
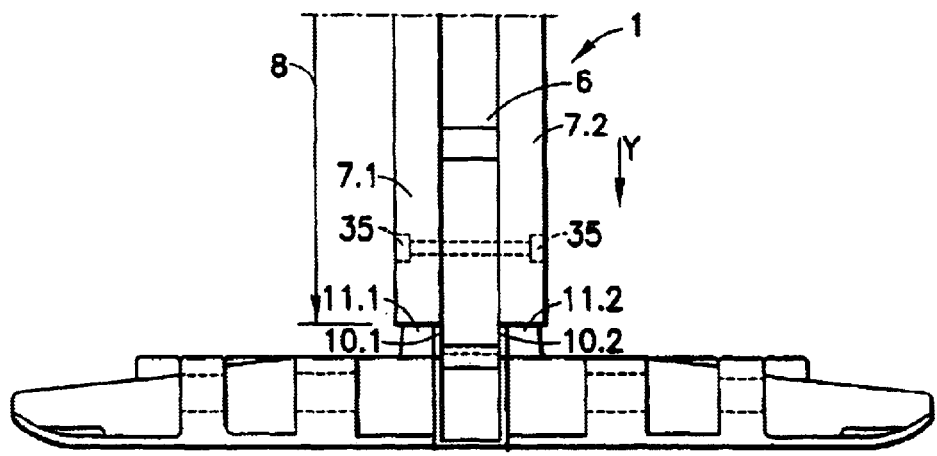
FIG. 2 is a partial view in direction X in FIG. 1.

FIG. 1 is a front view of a drive sprocket wheel 1 with part of the endless chain 21. According to the solution of the invention, the drive sprocket wheel 1 has an involute toothing arrangement. Each tooth 3 has two flanks 4.1, 4.2, of which the contour corresponds to an involute. The endless chain comprises individual chain links 5 (FIG. 3) which are produced in one piece and are connected releasably to one another. The details in this respect are described in relation to FIGS. 2–4. In contrast to the prior art, the drive sprocket wheel 1 is designed in a number of parts with a central toothed wheel rim 6 and two running treads 7.1, 7.2 connected releasably thereto with fastening elements 35 shown diagrammatically in FIG. 2. In a known manner, the external diameter 8 of the respective running tread 7.1, 7.2 is smaller than the diameter 9 of the root circle of the toothed wheel rim 6. In each case one wheel flange 10.1, 10.2 is formed on both sides of the toothed wheel rim 6 as a result of this difference in diameter. The individual chain link 5 likewise has, in a known manner, two guide webs 11.1, 11.2 which are arranged symmetrically in relation to the center and are spaced apart from one another. The respective inner surface 12.1 or 12.2 of the two guide webs 11.1, 11.2 acts as a guide together with the respective wheel flange 10.1 or 10.2 of the running treads 7.1, 7.2.

Figure 3:
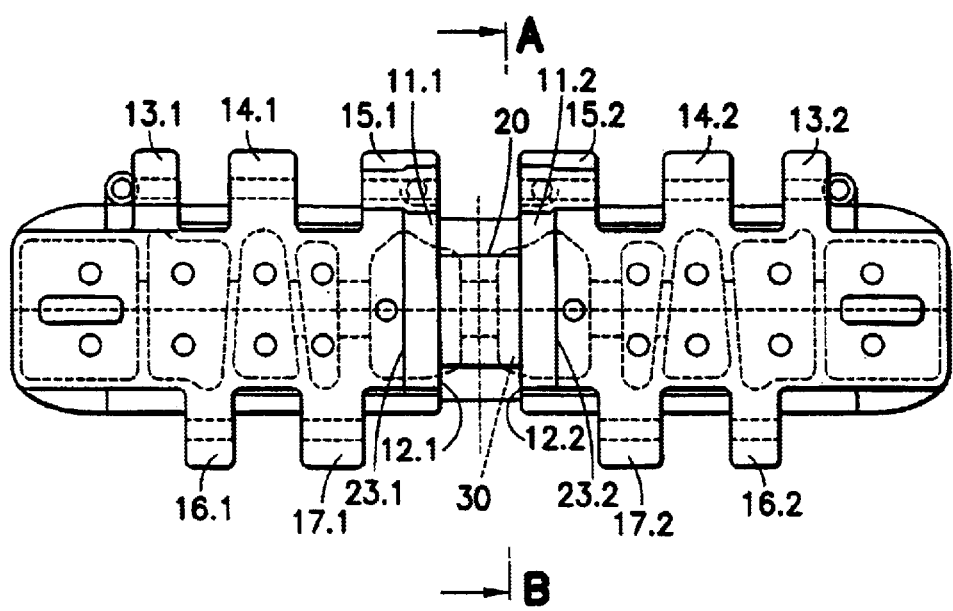
FIG. 3 is a plan view of a chain link in direction Y in FIG. 2.
Figure 4:
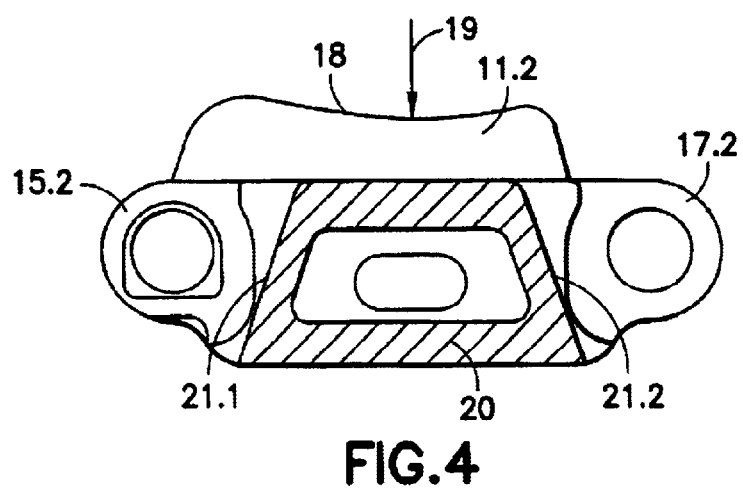
FIG. 4 is a section in direction A–B in FIG. 3.

The individual chain links 5 are fastened releasably by means of outer link plates 13.1–15.1; 13.2–15.2 and inner link plates 16.1, 17.1, 16.2, 17.2 arranged on the longitudinal sides and by means of chain bolts, which are fitted through the link-plate bores illustrated in FIGS. 3 and 4. There is preferably a total of six outer link plates 13.1, 13.2–15.1, 15.2 on one longitudinal side and, in the gaps located therebetween, four inner link plates 16.1, 16.2, 17.1, 17.2 on the other longitudinal side. The recesses 30 in the central region of the chain link 5, said recesses being illustrated by dashed lines, serve to reduce the weight of the solid body. The chain bolts are secured against slipping axially by means of a screw/nut connection, these being arranged on the respective first outer link plates 13.1 and 13.2 and third outer link plates 15.1 and 15.2 and as described below with reference to FIG. 7.

FIG. 4 shows the improved interaction between the chain links 5 and the running treads 7.1, 7.2. According to the solution of the invention, the top side 18 of the guide web 11.2 is curved concavely, the internal diameter 19 of the concave curvature preferably being equal to the external diameter 8 of the respective running tread 7.1, 7.2. The cam-like element 20, which is located between the two guide webs 11.1, 11.2 and connects the two guide webs, has, in both end regions, in each case one rectilinear flank 21.1, 21.2, which mesh with the involute-design flank 4.1, 4.2 of the respective tooth 3 of the drive sprocket wheel 1.

Figure 5:
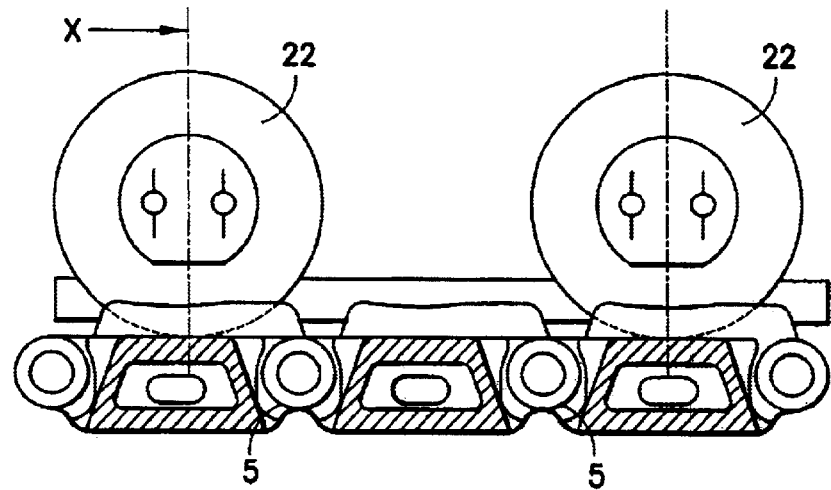
FIG. 5 is a side view in the region of the running rollers.
Figure 6:
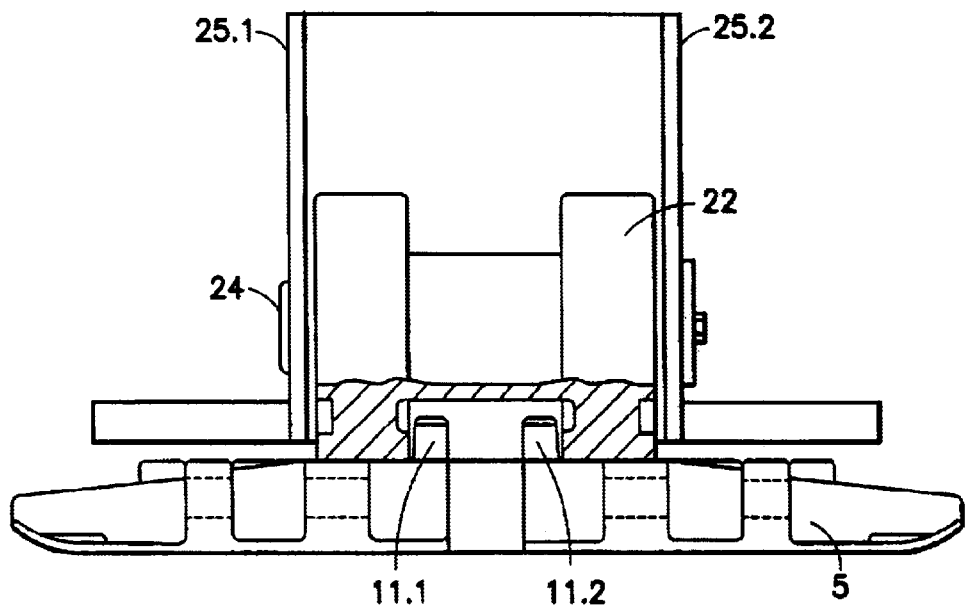
FIG. 6 is a view in direction X in FIG. 5.

FIGS. 5 and 6 show the improved guidance for the running rollers 22 by way of the outer surface 23.1, 23.2 (FIG. 3) of the respective guide web 11.1, 11.2. The running rollers 22 are mounted between two crosspieces 25.1, 25.2 by means of an axle 24.

Figure 7:
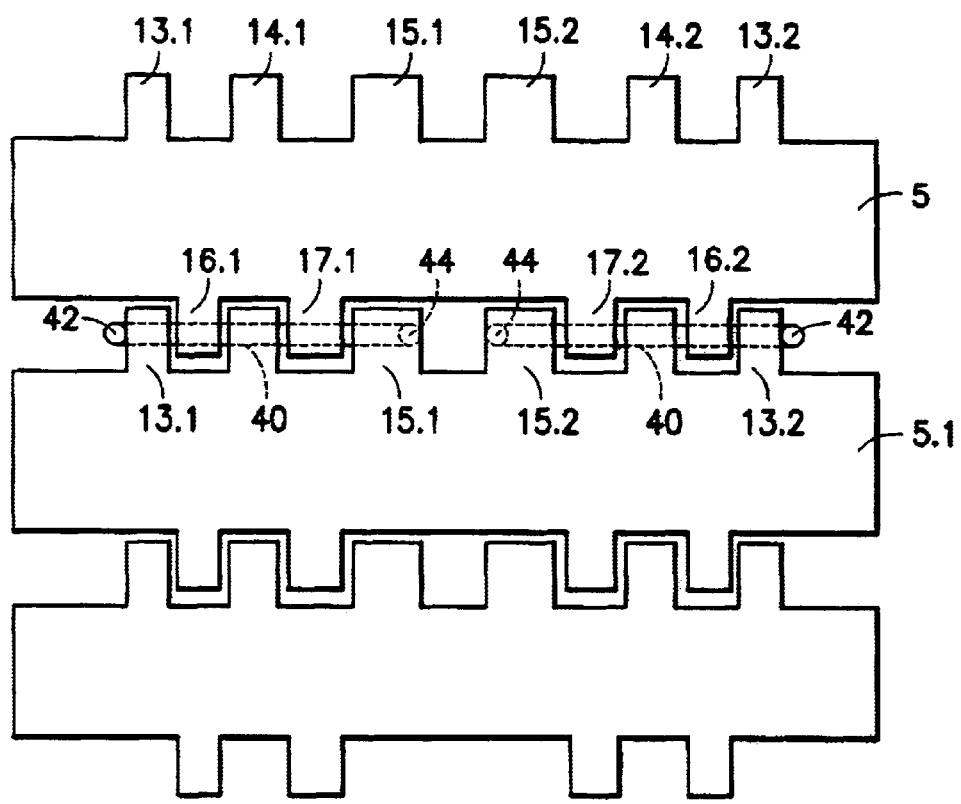
FIG. 7 is a plan view depicting the manner of releasably connecting one chain link in the chain with an adjacent chainlink.

FIG. 7 depicts the manner in which a chain link 5 is releasably connected with another adjacent chain link 5.1. The outer link plates 13.1–15.1 and 13.2–15.2 of each chain link are arranged in the two groups of three each shown, one group on either side of a center of the chain link. The inner link plates 16.1, 17.1 and 16.2, 17.2 are similarly arranged in two groups of two each with one group on either side of the chain link center. The outer link plates of chain link 5.1 interengage with the inner link plates of adjacent chain link 5, with each group of the outer link plates interengagingly associated with a group of inner link plates. A chain bolt 40 passes through aligned link plate bores in the link plate of each outer and inner link plate associated paired groups. To prevent chain bolt axial slipping, a securing element such as a screw/nut connection 42, 44 is arranged outside a first outer link plate 13.1, 13.2, and a third outer link plate 15.1 and 15.2 of the respective outer link plate groups.

List of Designations

| | |
|---|---|
| 1 | Drive sprocket wheel |
| 2 | Endless chain |
| 3 | Tooth |
| 4 | Tooth flank |
| 5 | Chain link |
| 6 | Toothed wheel rim |
| 7 | Running tread |
| 8 | External diameter of the running tread |
| 9 | Root-circle diameter |
| 10 | Wheel flange |
| 11 | Guide web |
| 12 | Inner surface of the guide web |
| 13, 14, 15 | Outer link plate |
| 16, 17 | Inner link plate |
| 18 | Top side of the guide web |
| 19 | Internal diameter |
| 20 | Cam-like element |
| 21 | Flank |
| 22 | Running roller |
| 23 | Outer surface of the guide web |
| 24 | Axle |
| 25 | Crosspiece |

What is claimed is:

1. A crawler undercarriage mechanism, comprising:

a plurality of running rollers;

at least one drive sprocket wheel rotatable about an axis of rotation and having two opposing axial sides and a plurality of chain teeth circumferentially distributed thereon and defining a chain tooth root diameter, and a running tread arranged on both axial sides of said at least one drive sprocket and having a running tread outer diameter that is smaller than said chain tooth root diameter by a difference in diameter and thereby forming a wheel flange at each of said two opposing axial sides, each chain tooth of said plurality of chain teeth having two circumferentially facing involute contoured flanks and said running tread having a convex curved surface; and an endless chain comprising a plurality of individual chain links reeved about said plurality of running rollers and said at least one drive sprocket for movement in a running direction, wherein each of said plurality of individual chain links comprises a center, a base plate, inner and outer link plates, and chain bolts received in said inner and outer link plates for releasably connecting said chain individual links with one another, each of said individual chain, links further comprising two guide webs spaced apart and extending along the running direction of said endless chain symetrically relative to said center of said each of said individual chain links, each of said web guides having a concave bearing surface for interacting with the convex curved surface of said running treads, a guide surface for interacting with a respective one of said wheel flanges and an outer surface for interacting with said guide rollers, said each of said plurality of individual chain links further comprising a lower-level cam-like element connecting said two web guides and having a rectilinear flank defining a substantially flat surface for meshed engagement, with said involute flanks of said plurality of chain teeth.

2. The crawler undercarriage mechanism of claim 1, wherein said concave bearing surface of said two guide webs has an internal diameter that corresponds to an external diameter of said convex curved surface of said running treads.

3. The crawler undercarriage mechanism of claim 1, wherein said at least one drive sprocket wheel includes a centrally located toothed wheel rim having said plurality of chain teeth, and separate running treads releasably connected to said wheel rim.

4. The crawler undercarriage mechanism of claim 2, wherein said at least one drive sprocket wheel includes a centrally located toothed wheel rim having said plurality of chain teeth, and separate running treads releasably connected to said wheel rim.

5. The crawler undercarriage mechanism of claim 3, wherein said wheel rim is made of a material having greater wear-resistance than a material from which said running treads are made.

6. The crawler undercarriage mechanism of claim 4, wherein said wheel rim is made of a material having greater wear-resistance than a material from which said running treads are made.

7. The crawler undercarriage mechanism of claim 1, wherein each chain link includes six outer link plates on one chain link longitudinal side, and four inner link plates on an opposite chain link longitudinal side, said inner link plates being longitudinally offset relative to said outer link plates.

8. The crawler undercarriage mechanism of claim 7, wherein said outer link plates are arranged on each chain link in groups of three on opposite sides of said chain link center, said inner link plates being arranged in groups of two on said opposite sides, each outer link plate group of a chain link interengaging with an associated inner link plate group of an adjacent chain link in said endless chain with one of said chain bolts received through said interengaging outer link plate group and associated inner link plate group, and a securing element for securing said one chain bolt against axial movement relative to said chain links.

9. The crawler undercarriage mechanism of claim 8, wherein said securing element comprises a threaded connection arranged on an outside of a first outer link plate and on an outside of a third outer link plate in each outer link plate group.

\* \* \* \* \*